US006627274B1

(12) United States Patent
Ginossatis et al.

(10) Patent No.: US 6,627,274 B1
(45) Date of Patent: Sep. 30, 2003

(54) MULTILAYER HEAT SHRINKABLE FILM

(75) Inventors: Stamatis Ginossatis, Attikis (GR); Jens Hestbech, Porto Rafti (GR)

(73) Assignee: Sporos SA, Attikis (GR)

( * ) Notice: Subject to any disclaimer, the term of this patent is extended or adjusted under 35 U.S.C. 154(b) by 0 days.

(21) Appl. No.: 09/857,119

(22) PCT Filed: Dec. 3, 1999

(86) PCT No.: PCT/IB99/02007

§ 371 (c)(1),
(2), (4) Date: Oct. 1, 2001

(87) PCT Pub. No.: WO00/32393

PCT Pub. Date: Jun. 8, 2000

(30) Foreign Application Priority Data

Dec. 3, 1998 (AU) .............................................. PP 7493

(51) Int. Cl.⁷ ......................... B32B 27/32; B65B 53/00
(52) U.S. Cl. .................... 428/34.9; 428/35.4; 428/36.7; 428/516; 428/518; 428/520
(58) Field of Search ............................... 428/35.4, 35.7, 428/36.6, 36.7, 516, 518, 520, 34.9

(56) References Cited

U.S. PATENT DOCUMENTS

| 4,640,856 | A | * | 2/1987 | Ferguson et al. | ........... 428/34.9 |
| 5,350,471 | A | * | 9/1994 | Planeta | ........................ 156/156 |
| 6,074,715 | A | * | 6/2000 | Lind et al. | .................. 428/35.4 |
| 6,110,570 | A | * | 8/2000 | Paleari et al. | ................ 428/213 |
| 6,150,011 | A | * | 11/2000 | Bax et al. | .................... 428/215 |
| 6,291,038 | B1 | * | 9/2001 | Babrowicz | ................... 428/34.9 |
| 6,296,947 | B1 | * | 10/2001 | Shah | .......................... 428/515 |

FOREIGN PATENT DOCUMENTS

EP       0 457 568 A2   *   11/1991

* cited by examiner

*Primary Examiner*—D. Lawrence Tarazano
(74) *Attorney, Agent, or Firm*—Peter F. Corless; Christine C. O'Day; Edwards & Angell, LLP

(57) ABSTRACT

A multilayer heat shrinkable film having high heat shrink, high burn-through resistance and a broad impulse sealing range including an outer and a heat sealable inner layer each of a thermoplastic polymer or copolymer, wherein said outer layer has a melting point at least 20° C. higher than said inner layer.

32 Claims, No Drawings

MULTILAYER HEAT SHRINKABLE FILM

FIELD OF THE INVENTION

This invention relates to multilayer heat shrinkable film.

This invention has particular application to such films for use in packaging or foods such as meat, poultry and the like. However, it is envisaged that films in accordance with the present invention may find use in other packaging applications such as packaging for curable putties and sealants.

BACKGROUND OF THE INVENTION

Primal meat cuts are generally smaller than a side of beef, but larger than the ultimate cut sold to the retail consumer. Primal cuts are prepared at the slaughter house and shipped to retail meat stores or restaurants where they are butchered into smaller cuts of meat commonly referred to as sub-primal meat cuts. Sub-primal cuts, however, may also be prepared at the slaughterhouse.

Primal and sub-primal cuts are packaged to minimize air (i.e. oxygen) exposure and prevent meat spoilage and discoloration during shipping and handling. One common way to package primal and sub-primal cuts and protect them from the adverse effects of air is to shrink package the cuts in a film having good oxygen barrier properties. For example, a multilayer film having a barrier layer containing polyvinylidene chloride (PVDC) is a well-known packaging material. PVDC is known to have excellent oxygen barrier properties. The other layers of the multilayer film function to protect the PVDC layer and provide the requisite low temperature and abrasion resistance properties, which the PVDC layer lacks. There are other types of biaxially oriented heat shrinkable multilayer films, which do not require oxygen barrier properties, for example films to be used for shrink wrapping poultry.

Shrinkage properties may be produced in a film by biaxially stretching the film in the machine and transverse direction. The resulting film will heat shrink within a specified range of percentages such as from about 20 to about 50 percent at about 90° C.

Multilayer heat shrinkable film may also be formed into packaging bags. Bags are generally made by transversely sealing a tubular stock of multilayer film and cutting or splitting the tube, or by superimposing flat sheets of multilayer film and sealing on three sides, or by end folding flat sheets and sealing the two sides. A common type of seal used in manufacturing bags is a hot bar seal. The adjacent thermoplastic layers, referred to as the inner layers, are sealed together by application of heat and pressure across the area to be sealed, using contact with opposing bars of which at least one is heated to cause the adjacent layers to fusion bond. Bags manufactured from a tube stock generally require one hot bar seal transverse to the tube. This seal is also referred to as a bottom seal. Once the bottom seal is applied, the tube stock is transversely cut to form the mouth of the bag. The strength of seals may be measured by determining the time for a seal to fail when under certain conditions. For example, the seal is immersed in hot water at 95° C. and the hot water seal strength ("HWSS") may be measured by a test such as that described as the "restrained shrinkage-seal strength test" in Funderburk et al U.S. Pat. No 3,900,635.

Once meat or poultry is inserted into the bag, the package is evacuated and the bag mouth must be sealed. At one time, the standard method for sealing a bag was to fasten a clip around the mouth of the bag. Today, impulse heat sealing techniques are employed to seal the bag mouth. In general, a bag mouth is impulse sealed by application of heat and pressure using opposing bars. At least one of the bars has a covered wire or ribbon through which electric current is passed for a very brief time period (hence the name "impulse") to cause the adjacent film layers to fusion bond. Following the impulse of heat the bars are cooled while continuing to hold the bag inner surfaces together to achieve adequate seal strength.

One problem with impulse heat sealing is that the film in the seal area often becomes extruded during sealing. This elongation of the product results in thinning of the film and in an extreme situation severing of the thinned film. The latter is known as burn-through. One solution to this "burn-through" problem is to irradiate the film prior to manufacture of the bag.

Irradiation of a multilayer film causes the various irradiated layers in the film to cross-link. Under controlled conditions, cross-linking by irradiation not only provides a higher temperature impulse heat sealing range, but also enhances the puncture resistance of the film. Under controlled conditions, polymeric multilayer films can be irradiated to produce a cross-linked product having greater puncture resistance characteristics and other enhancements. However, exposure to irradiation also causes a reduction of heat sealability in other layers at conventional temperatures, pressures and times using typical heat sealing equipment thereby resulting in poor bottom and edge seals in bags made from the film.

The equipment to irradiate the film is highly expensive, is costly to operate, increases the product cost, and usually requires an added step in the production operation.

Unfortunately, not all cross-linked thermoplastic films are easy to melt, making it difficult for food packagers to achieve strong seals, particularly by impulse sealing the bag mouths after filling with meat or poultry. All of the bag seals (including both the sealed bottom as for example made by the bag manufacturers with a hot bar and the impulse-sealed bag mouth by the food processor) must maintain their integrity when the food-containing package is immersed in hot water to shrink the film against the packaged food.

Prior art films typically used have the composition of the inner and outer layers with the same melting point and essentially the same polymers. It was found that if the inner and outer layers are not of similar composition the secondary bubble may not be stable during the biorientation step and the film would tend to curl inward or outward because the shrink of the inner and outer layers is not balanced. In other words, it a high shrinkage resin in the inner layer is combined with a low shrink outer layer or vice versa the resultant film will curl or roll up and not be able to be fabricated into bags.

Generally higher melting point resins do not have the same shrinkage as the lower melting point resins, hence the practice to use the same resins in the inner and outer layers and enhance the sealability of the film by cross-linking.

In spite of this generalization, there are films, such as Krehalon ML 40 and Vector 6 respectively made by Krehalon of Netherlands and Gunze of Japan, which include an outer layer having a higher melting point than the heat sealing inner layer. Krehalon ML 40 has a polyester outer layer, a polyethylene inner layer and core layers of polyamide and ethylene vinyl alcohol. Vector 6 has a polyamide outer layer and a polyethylene inner layer. However, polyesters and polyamides are very expensive and can limit the shrink of the film. This is seen in the cases of Krehalon ML 40 and Vector 6 which respectively have film shrink of 29/33% and 26/28% in the machine direction/ transverse direction (MD/TD).

SUMMARY OF THE INVENTION

This invention in one aspect resides broadly in a multilayer heat shrinkable film including an outer layer and a heat sealable inner layer, wherein said outer layer has a melting point at least 20° C. higher than said inner layer and said layers have substantially balanced shrinkage, and wherein said film shrinks at least 35% in at least one of machine and transverse directions by measuring unrestrained shrink of the stretched film at 90° C. for five seconds, or equivalent shrinkage thereof.

More suitably, the film shrinks at least 40% in at least one of machine and transverse directions by measuring unrestrained shrink of the stretched film at 90° C. for five seconds, or equivalent shrinkage thereof.

By "substantially balanced shrinkage" it is meant that the inner and outer layers are compatible in shrink such that the composite structure of the film does not curl either inward or outward. It is to be understood that the shrinkage of each separate inner and outer removed from the composite structure of the film is not to be considered when determining when a film has substantially balance shrinkage.

The term "polymer", as used herein, refers to the product of a polymerisation reaction, and is inclusive of homopolymers, copolymers, terpolymers etc.

Preferably, the outer layer is selected from a thermoplastic polymer blend. In the past, the composition of the outer layer was predetermined by the selection of heat sealable inner layer to prevent curl during biorientation, but leading to the problems of burn-through and the need for irradiation. It has been found that through the use of a blend of thermoplastic polymers, that the temperature resistance of the outer layer may be increased in comparison to the inner layer to prevent burn-through while maintaining compatible shrink.

It is to be understood that the melting point of the blend is calculated by averaging the melting points of the thermoplastic polymers in the blend taking into account the percentage of each polymer in the blend. The percentage of each polymer in the blend is multiplied by its melting point and the sum of these values is the melting point of the blend. For example if polymer A has a melting point of 100° C. and polymer B has a melting point of 200° C. a 50% blend of each has a melting point of 150° C. If a blend comprises 40% polymer A and 60% polymer B the blend has a melting point of 160° C.

Preferably, the outer layer is a blend of polypropylene (PP) and polybutylene (PB) and either a polyethylene (PE) or ethylene-vinyl acetate copolymer (EVA) or a combination thereof. More preferably, the polyethylene is an ethylene alpha olefin plastomer copolymer (plastomer). The outer layer may also include other thermoplastic materials as for example polypropylene, ethylene-propylene copolymer, ionomer, or an alpha olefin which includes members of the polyethylene family such as linear low density polyethylene (LLDPE), very low and ultra low density polyethylene (VLDPE and ULDPE) respectively, or blends of these materials.

The inner layer may be made of any suitable thermoplastic polymer that provides good heat sealing over a broad range. It is preferred that the inner layer is heat sealable to itself.

By "heat sealable" it is meant that the layer is capable of fusion bonding by conventional indirect heating means that generates sufficient heat on at least one film contact surface for conduction to the contiguous film contact surface and for the formation of a bond interface between without loss of the film integrity. Also, the bond interface may be sufficiently thermally stable to prevent gas or liquid leakage when exposed to above or below ambient temperatures during processing of food within the tube when sealed at both ends, i.e., in bag form. Finally, the bond interface between contiguous inner layers may have sufficient physical strength to withstand the tension resulting from stretching or shrinking due to the food body sealed within the tube.

The inner layer may be made of a heat sealable thermoplastic polymer or polymer blend. The heat sealable inner layer may be of any material conventionally used for its heat sealing capability. Heat sealable thermoplastic polymers are recognized by those skilled in the art as being capable of heat sealing to themselves at a variety of time, pressure and temperature conditions. For example, at a given pressure either a relatively high temperature may be applied briefly or a lower temperature may be applied for a longer period of time to obtain similarly suitable seals. It is to be appreciated that persons skilled in the art will be able to select sealing parameters such as temperature, pressure and time of application that depend upon such factors as the type of heat sealing equipment used.

The inner layer may be a blend of VLDPE, EVA and a plastomer. Suitably, the blend has combined melting point of about 94–96° C. The EVA may be at least 33% of the blend up to 60%, the VLDPE may be at least 20% of the blend up to 33% and the plastomer may be at least 15% of the blend up to 30%. The EVA may contain between about 3% and about 18% vinyl acetate.

Other suitable polymers and copolymers may include alpha olefins such as members of the polyethylene family such as linear low-density polyethylene (LLDPE); very low-density polyethylene sometimes referred to as ultra low-density polyethylene (VLDPE and ULDPE respectively), or blends thereof. Still other suitable thermoplastic polymers as the heat sealable inner layer include polypropylene, ethylene-propylene copolymer or an ionomer. It is to be understood however that the thermoplastic polymers mentioned herein are not intended to be an exhaustive list, but merely exemplary.

The inner and outer layers may be adhered together. Alternatively, the film may include adhesive, tie or further polymer layers therebetween. Adhesive and tie layer composites includes those which are well known in the art. Suitably an oxygen barrier layer separates the inner and outer layers.

In one embodiment, the inner and outer thermoplastic layers are adhered to opposite sides of a barrier core layer. One functional requirement of the barrier layer may be that together with the other layers, the oxygen transmission rate through the entire multilayer film may be below about 20 cc/1 m$^2$/24 hrs/atm. This is to avoid spoilage of certain food products, for example meat enclosed in the multilayer film package due to oxygen passage from the environment through the film wall. This requirement may be satisfied by numerous well-known barrier layer materials. For example, these may include certain of the polyamides (Nylon), hydrolyzed ethylene vinyl acetate copolymer (EVOH) and preferably a vinylidene copolymer. Vinylidene chloride-vinyl chloride (PVDC) is a commonly used copolymer but vinylidene chloride-methyl acrylate copolymer (MA-VDC) may also be used.

The outer thermoplastic layer may be on the opposite side of the core layer from the inner layer, and in the preferred three layer embodiment this outer layer is both directly adhered to the core layer and in direct contact with the environment. Since it is seen by the user/consumer, it may enhance optical properties of the film. Also, it may withstand contact with sharp objects so it is termed the abuse layer and provides abrasion resistance.

The thermoplastic outer layer may have a thickness of about 0.5 mils to 1.0 mils. Thinner layers may be less effective in performing the abuse resistance function, while thicker layers may reduce film stretchability. The multilayer film may be biaxially oriented to assist in heat shrinkability.

The thickness of the heat sealable inner thermoplastic first layer may be between about 0.4 mils and about 2.0 mils.

Thinner layers may not perform the described functions while thicker layers may not appreciably improve processability of the film and may reduce total film performance.

The barrier layer thickness may be between about 0.1 mils to about 0.5 mils. Thinner barrier layers may not perform the intended functions and thicker layers do not appreciably improve performance.

The three-layer film may have a total thickness of about 1.6 mils to about 3.0 mils, more preferably from about 1.8 mils to about 3.0 mils. Lower thickness may reduce the effectiveness of at least one of the three layers while higher thickness may reduce the film flexibility and do not appreciably improve its performance In general, various conventional additives such as slip agents and pigments may be incorporated in the film in accordance with conventional practice. While this embodiment of the invention is specifically described in terms of three layers, it should be understood that one or more additional layers may be directly adhered to the outside of the outer layer or between the barrier layer and the inner layer, or in place of the barrier layer, but not inside the inner layer. This additional layer may for example be EVA, LLDPE, VLDPE, polypropylene, EVOH, polyurethane, acrylonitrile nylon, ionomer, or blends thereof. For example, a fourth layer may be interposed between the outer layer and the barrier layer.

Whilst the advantages conferred from the composition of the outer layer may eliminate the need for irradiation of the multilayer film, it is to be understood that the multilayer heat shrinkable film in accordance with the invention may be irradiated to further enhance puncture and temperature resistance.

The heat shrinkable multilayer film in accordance with the present invention may be in the form of a tubular article or flat sheets. The multilayer film may be formed into bags useful for the packaging of meats. The multilayer film may be especially useful for those bags manufactured by hot bar or impulse sealing, and after meat is inserted therein, impulse heat sealing may be used to seal the mouth.

One end of the bag may be heat sealed by adhesion between contiguous inner layer surfaces in a direction transverse to the oppositely located sidewalls of the bag. The mouth end of the bag may be impulse heat sealable by fusion bonding between contiguous inner layer surfaces after filling the bag with food.

A bag from the multilayer film may be manufactured such that the inner layer forms the inside portion of the bag while the outer layer forms the outside portion of the bag. Accordingly, the inner layer of the tubular multilayer film may be the heat sealable layer, which is easily sealed by hot bar sealing. Moreover, because of the latter, the mouth of the bag may be more easily sealed by impulse heat sealing.

In a further aspect this invention resides in heat shrinkable multilayer film including:

an outer layer of a blend of PB, PP, and either a plastomer or EVA or combination thereof, whose combined melting point is between about 116° C. to 150° C., and an inner layer of VLDPE, EVA, and plastomer whose melting point is between about 94° C.–96° C.

Suitably, the melting point of the outer layer is between about 118° C. to 137° C.

In order that this invention may be more readily understood and put into practical effect, reference will now be made to the following examples which illustrate preferred embodiments of the invention.

DETAILED DESCRIPTION OF THE INVENTION

A heat shrinkable multilayer film was produced having:

a) an outer layer of a blend of PB, PP, and plastomer whose melting point is between about 129° C. to 136° C.;

b) a barrier core layer c) an inner layer of VLDPE, EVA, and plastomer whose melting point is about 95° C.

An alternative heat shrinkable multilayer film was also produced whereby the outer layer was substituted with an outer layer of a blend of PB, PP, plastomer and EVA whose melting point is about 118° C. A further heat shrinkable multilayer film was produced including an outer layer comprising a blend of PB, PP and EVA whose melting point is about 135° C. and a core layer which did not have barrier properties.

In each case, the inner layer included a blend of VLDPE, EVA, and plastomer whose combined melting point is about 95° C. The EVA is at least 33% of the blend up to 60%. The VLDPE is at 20% of the blend up to 33%. The plastomer is at least up to 15% of the blend up to 30%. The EVA may contain between about 3% and about 18% vinyl acetate.

In general, various conventional additives such as slip agents and pigments were incorporated in the films in accordance with conventional practice.

The multilayer film of this invention can be produced by known techniques such as by co-extruding the multiple layers into a primary tube, followed by biaxially stretching the tube by known techniques to form a heat shrinkable film. The "double bubble" technique disclosed in Pahlke U.S. Pat. No. 3,456,044 can be used to produce the film of this invention. Alternatively, the film may be a slot cast co-extruded multilayer film, which is subsequently biaxially stretched.

The thickness of the heat sealable inner layer is between about 0.4 mils and about 2.0 mils. The barrier layer thickness is between about 0.1 mils and about 0.5 mils. The thermoplastic outer layer thickness is between about 0.5 mils and 1.0 mils. Generally, the three-layer film has a total thickness of from about 1.6 mils to about 3.0 mils, more suitably from about 1.8 mils to about 3.0 mils.

The bag from the tubular multilayer heat shrinkable film is manufactured such that the inner layer forms the inside portion of the bag while the outer layer forms the outside portion of the bag. Accordingly, the inner layer of the tubular multilayer film is the heat sealable layer, which is easily sealed by hot bar sealing. Moreover, because of the latter, the mouth of the bag may be more easily sealed by impulse heat sealing when desired.

The multilayer heat shrinkable film may then be employed to manufacture heat shrinkable bags useful in packaging primal and sub-primal meat cuts and processed meats. Bags may be produced from the multilayer heat shrinkable film of this invention by any suitable method, but preferably by hot bar heat sealing. For instance, if the film of this invention is produced in a tubular stock, bags can be produced by hot bar sealing one end of a length of the tubular film or at any number of longitudinally spaced positions across the tube width, and then cutting the tube or splitting one edge to form the bag mouth. If the film of this invention is made in the form of flat sheets, bags can be formed by hot bar sealing three edges of two superimposed sheets of film. When carrying out the hot bar sealing operations, the surfaces which are heat sealed to each other to form seams are the first lower melting point outer layers of the multilayer films of the invention. Thus, for example, when forming a bag by heat sealing one edge of the length of tubular film, the inner surface of the tube, i.e., the surface which will be heat sealed to itself, will be the inner layer of the tubular multilayer film.

EXAMPLE 1

In this series of tests, bags of the same size (400 mm long×200 mm wide) were fabricated from three layer films comprising a heat sealable thermoplastic inner layer, a core layer adhered on one side to the sealable inner layer, and a second thermoplastic outer layer adhered to the opposite side of the oxygen barrier layer. The core layer in most tests was a vinylidene chloride copolymer type oxygen barrier. The three-layer film was the biaxially oriented heat shrinkable type, prepared by the double or trapped bubble method as broadly described in the aforementioned Palkhe U.S. Pat. No. 3,456,044. In particular, all three layers were simultaneously coextruded.

Certain physical properties of bags were measured by either of the test procedures discussed below.

Shrinkage values were obtained by measuring unrestrained shrink of the stretched film at 90° C. for five seconds. Four test specimens were cut from a given sample of the oriented film to be tested. The specimens were cut to 10 cm in the machine direction by 10 cm. in the transverse direction. Each specimen was completely immersed for 5 seconds in a 90° C. water bath. The distance between the ends of the shrunken specimen was measured. The difference in the measured distance for the shrunken specimen and the original 10 cm was multiplied by ten to obtain the percent of shrinkage for the specimen. The shrinkage for the four specimens was averaged for the MD shrinkage values of the given film sample, and the shrinkage for the four specimens was averaged for the TD shrinkage value.

The impulse sealing range test is run to determine and compare the acceptable voltage ranges for impulse sealing plastic films. An evacuator impulse sealer used by the meat industry to evacuate and products placed into the bags was used. Boss Vacuum Packaging Machines manufacture this evacuator sealer. This evacuator sealer is equipped with impulse sealing ribbons covered by a Teflon cloth. A constant voltage is applied to the sealing ribbons and is not adjustable. (This is typical for evacuator sealers used commercially by industry.) The time that the voltage is applied to the sealing ribbons is adjustable to control the sealing time to obtain a leak proof strong seal. The time is adjustable from 0 to 4.0 seconds or from 0 to 10 on the indicator on the machine.

Film samples are placed in the evacuator sealer and the sealing time is adjusted to determine the minimum time that is required to obtain a strong seal and the maximum time that a good seal can be obtained without burn through.

The results of these tests are summarized in Table A. Table B defines the formulations of the inner and outer layers. Table C defines the individual resins that were used. The melting point of the various blends is calculated by averaging the melting points of the thermoplastic polymers in the blend taking into account the percentage of each polymer in the blend. The percentage of each polymer in the blend is multiplied by its melting point and the sum of these values is the melting point of the blend.

TABLE A

| Test No. | Shrink MD % | Shrink TD % | Optics Haze % | Optics Gloss | Sealing Range Min. | Sealing Range Max. | Curling | Melt Temperature ° C. Inner Layer | Melt Temperature ° C. Outer Layer |
|---|---|---|---|---|---|---|---|---|---|
| 1 | 48 | 50 | 11 | 75 | 3 | 3.5 | None | 95 | 94 |
| 2 | 45 | 50 | 15 | 70 | 3 | 5 | None | 95 | 118.5 |
| 3 | 50 | 52 | 8.3 | 83 | 3 | 6 | None | 95 | 134.7 |
| 4 | 26 | 34 | 11 | 75 | 3 | 6 | High | 95 | 135.5 |
| 5 | 37 | 45 | 13 | 62 | 3 | 6 | High | 95 | 131.5 |
| 6 | 45 | 52 | 9.5 | 75 | 3 | 5 | None | 95 | 129.4 |
| 7 | 44 | 47 | 8.5 | 75 | 3 | 5 | None | 95 | 130.6 |
| 8 | 40 | 47 | 12 | 60 | 3 | 7 | None | 95 | 136.4 |
| 9 | 45 | 48 | 13 | 75 | 3 | 5 | None | 95 | 135.0 |
| 10 | 32 | 38 | 18 | 65 | 3 | 5 | None | 95 | 135.0 |

TABLE B

| Test | Outer Layer 28% Type | % | Type | % | Type | % | Type | % | Core 10% | Inner Layer 62% Type | % | Type | % | Type | % |
|---|---|---|---|---|---|---|---|---|---|---|---|---|---|---|---|
| 1 | E1 | 55 | V1 | 14 | P1 | 28 | | | PVDC | E1 | 40 | V1 | 25 | P1 | 32 |
| 2 | E1 | 40 | PB1 | 20 | PP1 | 21 | P1 | 18 | PVDC | E1 | 40 | V1 | 25 | P1 | 32 |
| 3 | PB1 | 40 | PP1 | 41 | P1 | 18 | | | PVDC | E1 | 40 | V1 | 25 | P1 | 32 |
| 4 | V1 | 40 | PP1 | 41 | P2 | 18 | | | PVDC | E1 | 40 | V1 | 25 | P1 | 32 |
| 5 | PB1 | 40 | PP2 | 41 | PP3 | 18 | | | PVDC | E1 | 40 | V1 | 25 | P1 | 32 |
| 6 | PB1 | 40 | PP2 | 41 | P1 | 18 | | | PVDC | E1 | 40 | V1 | 25 | P1 | 32 |
| 7 | PB1 | 40 | PP4 | 41 | P1 | 18 | | | PVDC | E1 | 40 | V1 | 25 | P1 | 32 |
| 8 | PB1 | 41 | PP5 | 41 | P1 | 18 | | | PVDC | E1 | 40 | V1 | 25 | P1 | 32 |
| 9 | PB1 | 41 | PP5 | 41 | P2 | 18 | | | PVDC | E1 | 40 | V1 | 25 | P1 | 32 |
| 10 | PB1 | 41 | PP5 | 41 | E2 | 18 | | | E2 | E1 | 40 | L1 | 25 | P1 | 32 |

TABLE C

| Type | Description | Manufacturer | Melt Index g/10 min | Density g/cm³ | Melting Point ° C. |
|---|---|---|---|---|---|
| E1 | 70% EVA 13.5% VA | ATO Evatane VN1003 VN4 13.5% VA | 0.35 | 0.935 | 93 |
| | 30% EVA 5% VA | VN1005 VN2 5% VA | 0.40 | 0.928 | 102 |
| E2 | 100% EVA | VN1005 VN2 5% VA | 0.40 | 0.928 | 102 |

TABLE C-continued

| Type | Description | Manufacturer | Melt Index g/10 min | Density g/cm³ | Melting Point ° C. |
|------|-------------|--------------|---------------------|---------------|--------------------|
| V1 | VLDPE | Dow Attane SL 4100 | 1.00 | 0.912 | 122 |
| P1 | Plastomer | Dow Affinity PF 1140 | 1.6 | 0.896 | 94 |
| P2 | Plastomer | Dow Affinity VP 8770 | 1.0 | 0.885 | 74 |
| PB1 | Polybutylene | Shell 8640 | 2 | | 118 |
| PP1 | Polypropylene | BASF 1325 | 8 | | 158 |
| PP2 | Polypropylene | Montell PLZ860 | 2.0 | 0.897 | 140–145 |
| PP3 | Polypropylene | Montell Adsyl 5 C 37 F | 5.50 | 0.89 | 135 |
| PP4 | Polypropylene | ATO APRYLL 3020GN23 | | | 148 |
| PP5 | Polypropylene | Montell HF 6100 | | | 161 |
| L1 | LLDPE | Dow Dowlex 5056 | 1.1 | 0.919 | 122 |

Test 1 consists of a heat shrinkable non-crosslinked film that is a typical construction used in the industry. The melting temperature of the inner and outer layer is the same. While the seal strength of this film meets the requirements for the products the seal range is very narrow as shown in table A. Typically this type of film is cross linked by radiation to obtain a maximum setting of about 8.

Tests 2, & 3 use the same inner sealing layer as in test 1 but the outer layer formulation was changed to use higher melting point resins. Without cross-linking the sealing range was significantly increased. Surprisingly none of the films had curling.

Test 4 and 5 is the same as tests 2 & 3 but the outer layer construction was made with different resins. While the sealing range was increased significantly the film curl was not acceptable and the film could not be fabricated into bags. The composition of the outer layer did not have compatible shrink to the inner.

Tests 6, 7, 8 and 9 illustrate the use of different resins and formulations in the outer layers in accordance with the invention. The sealing range was increased and the films have high shrink properties.

In Test 10 the barrier layer was substituted a non-barrier type material. The outer layer is in accordance with the invention. The films had a good heat sealing range and shrinkage.

EXAMPLE 2

In addition to the above-described laboratory tests trials were conducted on a VC999 evacuator, sealer. Bags fabricated from the formulation defined in test 1 were compared to bags fabricated from the formulation in test 3. About 500 bags from each formulation were packaged in a processed meat product, placed in the VC999 and evacuated and sealed. The bags containing the product were then immersed in 87C water to tightly shrink the bags around the product.

About 15% of the bags made from the test 1 formulation failed at the VC999 seal either after the evacuation, sealing cycle or after shrinking in the hot water. Only 1.2% failures occurred with bags made from the test 3 formulation. This failure rate was considered normal for the type of product that was being packaged and is equivalent to bags made from films that had been cross-linked.

In use, the present invention provides a multilayer film having high hot water seal strength, high burn-through resistance, a broad impulse sealing range and enhanced puncture resistance without the added step to cross-link the film with irradiation. The multilayer film structure can be more easily and efficiently formulated into a packaging bag. It also provides a meat and poultry packaging bag having both improved bottom and edge seals formed by e.g. hot bar sealing and after food is packaged therein, and improved mouth seals formed by impulse heat sealing.

It will of course be realised that while the foregoing has been given by way of illustrative example of this invention, all such and other modifications and variations thereto as would be apparent to persons skilled In the art are deemed to fall within the broad scope and ambit of this invention as is herein set forth.

What is claimed is:

1. A multilayer heat shrinkable film including at least:
   an outer layer of a thermoplastic copolymer blend including at least one ethylene alpha olefin plastomer copolymer or at least one ethylene vinyl acetate copolymer, and
   a heat sealable inner layer of a thermoplastic polymer or a thermoplastic polymer blend, wherein said outer layer has a melting point at least 20° C. higher than said inner layer and said layers being selected to have substantially balanced shrinkage, and wherein said film is oriented to an extent selected to provide shrinkability of at least 35% in at least one of machine and transverse directions, determined by measuring unrestrained shrink of the stretched film at 90° C. for five seconds, or equivalent shrinkage thereof.

2. A multilayer heat shrinkable film according to claim 1, wherein the film shrinks at least 40% in at least one of machine and transverse directions.

3. A multilayer heat shrinkable film according to claim 2, wherein the film shrinks at least 50% in at least one of machine and transverse directions.

4. A multilayer heat shrinkable film according to claim 1, wherein said outer layer has a melting point at least 30° C. higher than said inner layer.

5. A multilayer heat shrinkable film according to claim 1, wherein the outer layer blend includes polypropylene and polybutylene.

6. A multilayer heat shrinkable film according to claim 1, wherein the outer layer blend includes polypropylene, polybutylene, ethylene vinyl acetate copolymer and ethylene alpha olefin plastomer copolymer.

7. A multilayer heat shrinkable film according to claim 5, wherein the melting point of the outer layer blend is about 116° C. to about 150° C.

8. A multilayer heat shrinkable film according to claim 7, wherein the melting point of the outer layer blend is about 116° C. to about 137° C.

9. A multilayer heat shrinkable film according to claim 1, wherein the inner layer includes at least one of linear low density polyethylene, very low density polyethylene, ethylene vinyl acetate copolymer, ethylene alpha olefin plastomer copolymer or a blend thereof.

10. A multilayer heat shrinkable film according to claim 1, wherein the inner layer is a blend of ethylene vinyl acetate copolymer, ethylene alpha olefin plastomer copolymer and very low density polyethylene or linear low density polyethylene.

11. A multilayer heat shrinkable film according to claim 10, wherein the inner layer includes a blend of two ethylene vinyl acetate copolymers.

12. A multilayer heat shrinkable film according to claim 10, wherein the inner layer includes a blend of 33% to 60% ethylene vinyl acetate copolymer, 15% to 30% ethylene alpha olefin plastomer copolymer and 20% to 33% very low density polyethylene or linear low density polyethylene based on weight.

13. A multilayer heat shrinkable film according to claim 10, wherein the melting point of the inner layer blend is about 94 to about 96° C.

14. A multilayer heat shrinkable film according to claim 1, having at least one thermoplastic polymer oxygen barrier layer between the inner layer and the outer layer.

15. A multilayer heat shrinkable film according to claim 14, wherein the oxygen barrier layer is hydrolyzed ethylene vinyl acetate copolymer or vinylidene copolymer.

16. A multilayer heat shrinkable film according to claim 15, wherein the vinylidene copolymer is selected from vinylidene chloride-vinyl chloride copolymer or vinylidene chloride-methyl acrylate copolymer.

17. A multilayer heat shrinkable film according to claim 1, having at least one thermoplastic polymer layer between the inner layer and the outer layer, said thermoplastic polymer layer including at least one of very low density polyethylene, linear low density polyethylene, ethylene vinyl acetate copolymer, ethylene alpha olefin plastomer copolymer or a blend thereof.

18. A multilayer heat shrinkable film according to claim 14, wherein the thickness of the outer layer is about 0.5 mils to about 1.0 mils, the thickness of heat sealable inner layer is about 0.4 mils to about 2.0 mils, the thickness of the barrier layer is about 0.1 mils to about 0.5 mils and the total thickness of the film is about 1.6 mils to about 3.0 mils.

19. A multilayer heat shrinkable film according to claim 1, wherein the film is irradiated.

20. A multilayer heat shrinkable film according to claim 1, wherein the film is formed into bags.

21. A multilayer heat shrinkable film according to claim 28, having at least one thermoplastic polymer oxygen barrier layer between the inner layer and the outer layer.

22. A multilayer heat shrinkable film according to claim 21, wherein the barrier layer is hydrolyzed ethylene vinyl acetate copolymer or vinylidene copolymer.

23. A multilayer heat shrinkable film according to claim 22, wherein the vinylidene copolymer is selected from vinylidene chloride-vinyl chloride copolymer or a vinylidene chloride-methyl acrylate copolymer.

24. A multilayer heat shrinkable film including:
an outer layer of a blend including polybutylene, polypropylene and at least one of ethylene alpha olefin plastomer copolymer or ethylene vinyl acetate copolymer, wherein the melting point of the outer layer blend is about 116° C. to about 150° C., and
an inner layer of a blend including ethylene vinyl acetate copolymer, ethylene alpha olefin plastomer copolymer and very low density polyethylene or linear low density polyethylene, wherein the melting point of the inner layer blend is about 94° C. to about 96° C.

25. A multilayer heat shrinkable film according to claim 24, wherein said film shrinks at least 35% in at least one of machine and transverse directions by measuring unrestrained shrink of the stretched film at 90° C. for five seconds, or equivalent shrinkage thereof.

26. A multilayer heat shrinkable film according to claim 24, wherein the melting point of the outer layer blend is about 117° C. to about 137° C.

27. A multilayer heat shrinkable film according to claim 24, wherein the outer layer is a blend of polypropylene, polybutylene, ethylene vinyl acetate copolymer and ethylene alpha olefin plastomer copolymer.

28. A multilayer heat shrinkable film according to claim 24, wherein the inner layer blend includes 33% to 60% ethylene vinyl acetate copolymer, 15% to 30% ethylene alpha olefin plastomer copolymer, 20% to 33% very low density polyethylene or linear low density polyethylene based on weight.

29. A multilayer heat shrinkable film according to claim 24, having at least one thermoplastic polymer layer between the inner layer and the outer layer, said thermoplastic polymer layer including at least one of very low density polyethylene, linear low density polyethylene, ethylene vinyl acetate copolymer, ethylene alpha olefin plastomer copolymer or a blend thereof.

30. A multilayer heat shrinkable film according to claim 24, wherein the thickness of the outer layer is about 0.5 mils to about 1.0 mils, the thickness of heat sealable inner layer is about 0.4 mils to about 2.0 mils, the thickness of the barrier layer is about 0.1 mils to about 0.5 mils and the total thickness of the film is about 1.6 mils to about 3.0 mils.

31. A multilayer heat shrinkable film according to claim 24, wherein the film is irradiated.

32. A multilayer heat shrinkable film according to claim 24, wherein the film is formed into bags.

* * * * *